(12) United States Patent
Haaheim (10) Patent No.: US 8,256,017 B2
(45) Date of Patent: Aug. 28, 2012

(54) USING OPTICAL DEFLECTION OF CANTILEVERS FOR ALIGNMENT

(75) Inventor: Jason Haaheim, Chicago, IL (US)

(73) Assignee: NanoInk, Inc., Skokie, IL (US)

( * ) Notice: Subject to any disclaimer, the term of this patent is extended or adjusted under 35 U.S.C. 154(b) by 476 days.

(21) Appl. No.: 11/848,211

(22) Filed: Aug. 30, 2007

(65) Prior Publication Data

US 2008/0055598 A1 Mar. 6, 2008

Related U.S. Application Data

(60) Provisional application No. 60/841,210, filed on Aug. 31, 2006.

(51) Int. Cl.
*G01Q 10/04* (2010.01)
(52) U.S. Cl. .............. 850/1; 850/2; 850/6; 850/52
(58) Field of Classification Search .......... 850/1, 2, 850/6, 7, 19, 20, 21, 26, 29, 30, 32, 33, 40, 850/52, 53, 54
See application file for complete search history.

(56) References Cited

U.S. PATENT DOCUMENTS

| | | | |
|---|---|---|---|
| 4,954,704 A | 9/1990 | Elings et al. | |
| 4,999,494 A | 3/1991 | Elings | |
| 5,204,531 A | 4/1993 | Elings et al. | |
| 5,705,814 A | 1/1998 | Young et al. | |
| 6,008,489 A | 12/1999 | Elings et al. | |
| 6,032,518 A | 3/2000 | Prater et al. | |
| 6,635,311 B1 | 10/2003 | Mirkin et al. | |
| 6,642,179 B2 | 11/2003 | Watschke | |
| 6,827,979 B2 | 12/2004 | Mirkin et al. | |
| 6,906,450 B2 * | 6/2005 | Tamayo De Miguel et al. | 310/317 |
| 7,005,378 B2 | 2/2006 | Crocker et al. | |
| 7,008,769 B2 | 3/2006 | Henderson et al. | |
| 7,034,854 B2 | 4/2006 | Cruchon-Dupeyrat et al. | |
| 7,060,977 B1 | 6/2006 | Dupeyrat et al. | |
| 7,081,624 B2 | 7/2006 | Liu et al. | |
| 2001/0054691 A1 * | 12/2001 | Park et al. | 250/309 |
| 2003/0185967 A1 | 10/2003 | Eby et al. | |

(Continued)

FOREIGN PATENT DOCUMENTS

WO WO 2005/115630 A2 4/2005

OTHER PUBLICATIONS

Bottomley et al., Anal. Chem., 70, 425R-475-R.

(Continued)

*Primary Examiner* — David A Vanore
*Assistant Examiner* — Nicole Ippolito
(74) *Attorney, Agent, or Firm* — Foley & Lardner LLP (57) ABSTRACT

A calibration leveling system and method are provided which improve printing and imaging at the nanoscale including improved tip-based deposition and nanolithography. The system can include a scanning probe instrument having a video camera with an adjustable lens. The scanner can be coupled to a one or two dimensional array of cantilevers comprising cantilever tips for imaging or printing. The scanning probe instrument has one or more motors for controlling the scanner in the z-axis. The z-axis motors position the scanner so that the cantilever tips are in a level orientation relative to the surface of a substrate. Once the cantilever tips are level with the substrate, the positions of the z-axis motors can be recorded for future reference.

19 Claims, 7 Drawing Sheets

U.S. PATENT DOCUMENTS

| | | | |
|---|---|---|---|
| 2003/0226955 A1* | 12/2003 | Kim et al. | 250/221 |
| 2004/0026007 A1* | 2/2004 | Hubert et al. | 156/64 |
| 2005/0255237 A1* | 11/2005 | Zhang et al. | 427/180 |
| 2006/0108534 A1* | 5/2006 | Kerpershoek et al. | 250/370.09 |
| 2007/0295064 A1* | 12/2007 | Degertekin et al. | 73/105 |
| 2008/0061231 A1* | 3/2008 | Chamberlin et al. | 250/306 |
| 2008/0105042 A1 | 5/2008 | Mirkin | |
| 2008/0142709 A1* | 6/2008 | Sumant et al. | 250/306 |

OTHER PUBLICATIONS

Nyffenegger et al., Chem. Rev., 1997, 1195-1230.

U.S. Appl. No. 60/792,950, filed Apr. 22, 2007, Mirkin.

U.S. Appl. No. 60/894,657, filed Mar. 13, 2007, Haaheim.

Salaita et al., "Sub-100 nm, Centimeter-Scale, Parallel Dip-Pen Nanolithography", Small, 2005, vol. 1(10), pp. 940-945.

* cited by examiner

FIG. 1 rubbing

FIG. 2 edge of chip rubbing

USING OPTICAL DEFLECTION OF CANTILEVERS FOR ALIGNMENT

RELATED APPLICATIONS

This application claims priority to U.S. provisional application Ser. No. 60/841,210 filed Aug. 31, 2006 to Haaheim, which is hereby incorporated by reference in its entirety.

BACKGROUND

The following background is provided simply as an aid in understanding the disclosed subject matter and is not admitted to describe or constitute prior art to the disclosed subject matter.

Nanotechnology is a field of applied science focused on the design, synthesis, characterization and application of materials and devices on the nanoscale. As the demand for nanoscale products grows there is a need for mass producing nanoscale technologies. Due to the size of these technologies, specialized equipment and processes capable of the controlled placement of nano materials have been developed.

For example, nanolithography is a method of nanoscale manufacturing used to build nanometer scale structures and patterns, in some cases, by literally drawing materials directly onto a surface (direct write lithography). One example of nanolithography is DPN® printing (NanoInk, Chicago, Ill.). Using this and other methods, nanolithography users can build at resolutions ranging from many micrometers down to 15 nanometers, using virtually any material. This combination of ultrahigh resolution and material flexibility makes for numerous commercial applications. See for example U.S. Pat. No. 6,827,979 to Mirkin et al., U.S. Pat. No. 6,642,179 to Liu et al., and U.S. Pat. No. 7,081,624 to Liu et al.

Scanning probe technology provides a foundation for the hardware platform of nanolithography writing systems including DPN printing. In using a scanning probe instrument for lithography, a molecule-coated probe tip which becomes a pen is used to deposit "ink" material onto a surface. The deposition process involves a chemically engineered ink-and-substrate combination, and the ubiquitous nanoscale positioning control offered by scanning probes provides the ability to produce high-quality nanolithographic patterns. See for example U.S. Pat. Nos. 7,034,854 to Cruchon-Dupeyrat et al. and U.S. Pat. No. 7,005,378 to Crocker et al.

Nanolithography methods have been developed to pattern a wide variety of ink-substrate combinations. Nanolithography is compatible with many inks, from small organic molecules to organic and biological polymers, and from colloidal particles to metals ions and sols. Nanolithography can also be used to pattern onto many different surfaces ranging from metals to insulators, as well as to pattern on top of functional monolayers adsorbed on a variety of surfaces.

To provide high quality patterning, calibration and alignment are important. See for example U.S. Pat. No. 7,060,977 to Cruchon-Dupeyrat et al. and US patent publication 2003/0185967 to Eby et al.

Figure 1:
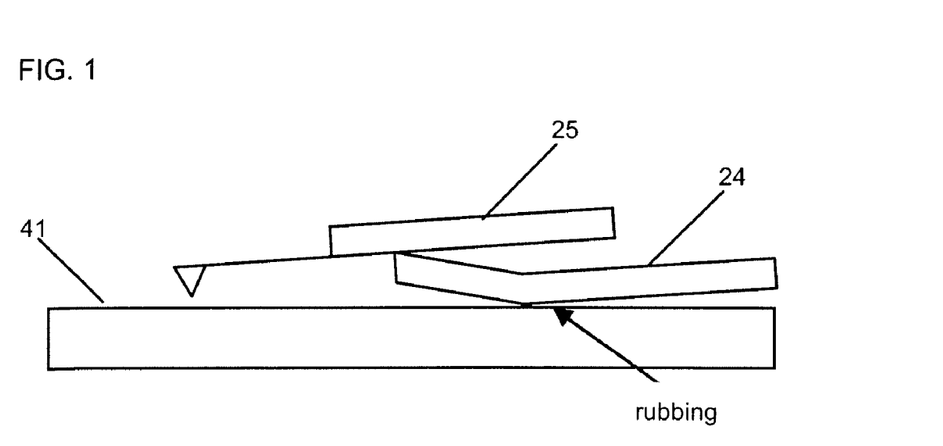
FIG. 1 is a block diagram depicting a probe chip and undesired rubbing with the surface from a piece that helps couple a probe chip to a scanner.
Figure 2:
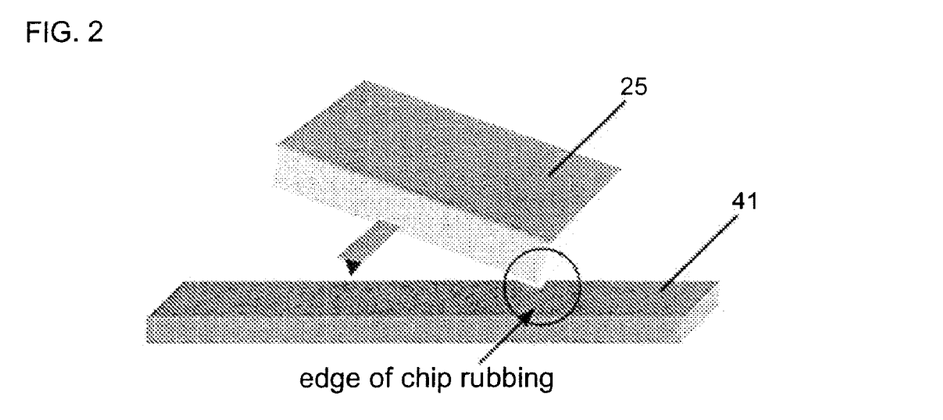
FIG. 2 is a block diagram depicting a probe chip positioned on a substrate at an incorrect engage angle.

Increased noise, non-orthogonal and curvy features and probe fishtailing are pitfalls that can arise in conventional nanolithography systems including DPN printing, particularly with inexperienced users facing difficult patterning or imaging problems. Cantilever tips and cantilever arrays can be operatively coupled with scanners by mechanical devices which can include mechanical clips which allow changing of probes. However, mechanical pieces can rub against a substrate which causes image distortion and feedback related oscillations. These problems are all caused by a probe chip being arranged in a non-planar orientation with respect to a substrate. For example, as shown in FIG. 1, a tip clip 24 for use with a probe chip 25 may inadvertently come into contact with a substrate 41. In the alternative, as illustrated in FIG. 2, the edge of the probe chip 25 may also cause rubbing. Accordingly there is a need for a system and method for calibrating nanolithography probes with respect to a substrate to eliminate the above-mentioned problems.

SUMMARY

Presently, improved patterning and imaging methods are provided which advance nanolithography, particularly with inexperience users and those facing challenging patterning problems.

For example, provided herein is a method comprising: providing a scanning probe instrument comprising a scanner operatively coupled to a one dimensional array of cantilevers comprising cantilever tips for imaging or printing; providing a flat substrate surface; wherein the position of the array of cantilever tips with respect to the substrate is controlled by three z-axis motors $Z1$, $Z2$, and $Z3$ in a triangular, surrounding relationship with respect to the array; wherein the $Z1$, $Z2$, and $Z3$ motors are adapted to raise and lower the cantilever tips with respect to the surface; wherein the $Z1$ motor is also adapted to tilt the cantilever tips with respect to the substrate surface, and the $Z2$ and $Z3$ motors are adapted to level the cantilever tips with respect to the substrate surface; lowering the array until at least some of the cantilever tips touch the surface; adjust the $Z2$ motor, the $Z3$ motor, or both $Z2$ and $Z3$ motors, until all the cantilever tips are substantially level with respect to the substrate surface, and record the relative positions of the z-axis motors for future calibration reference.

The array of cantilevers can be a passive array or an active array. The cantilever tips can be nanoscopic tips including for example scanning probe microscope tips or atomic force microscope tips. The cantilever tips can be also adapted to provide an opening coupled to a microfluidic channel. An optical lens system can be used to determine whether the cantilever tips are level. Reflections from the cantilevers can be used to determine leveling. The lowering step can be carried out at increments of less than five microns until the cantilevers touch the surface of the substrate. The method can further comprise imaging or printing. The method can further comprise the step of printing by depositing material from a cantilever tip to a surface. The method can further comprise the step of printing or imaging with a single cantilever tip or an array comprising a plurality of cantilever tips.

In addition, also provided is a method comprising: (i) leveling a one dimensional array of cantilevers comprising tips with respect to a substrate surface, (ii) recording the level position for calibration, and (iii) printing or imaging with use of the level position for calibration. Again, leveling can be determined by use of reflections from the cantilevers and an optical system.

Another embodiment is a method comprising: (i) providing a scanning probe instrument having one or more z-axis motors mounted to the scanning probe instrument, for controlling a scanner operatively coupled to a one dimensional array of cantilevers comprising cantilever tips for imaging or printing in the z-axis; (ii) positioning the scanner until one or more cantilever tips touch a substrate; (iii) determining the position of the cantilever tips on the surface of the substrate; (iv) adjusting one or more z-axis motors to position the array of cantilevers so that each cantilever tip is in level contact with the substrate; and (v) recording the relative positions of the z-axis motors.

Another method comprises: (i) providing a scanning probe instrument having one or more z-axis motors mounted to the scanning probe instrument, for controlling a scanner operatively coupled to a one dimensional or two dimensional array of cantilevers comprising cantilever tips for imaging or printing in the z-axis; (ii) lowering the scanner toward the surface of a sample holder a predetermined amount using a first z-axis motor; (iii) focusing on the scanner using an optical lens system; (iv) positioning the scanner until one or more cantilever tips touch a substrate; (v) determining the position of the cantilever tips on the surface of the substrate; (vi) adjusting one or more z-axis motors to position the array of cantilevers so that each cantilever tip is in level contact with the substrate; and recording the relative positions of the scanner and the z-axis motors.

Advantages include better patterning, printing, and imaging, particularly when complex, high resolution needs arise. The methods are relatively simple and do not generally require expensive or difficult to use components or software. In particular, advantages include for imaging noiseless, higher quality images, mechanical coupling with the surface which is focused on the tip-surface coupling, and features represent reality with fewer artifacts. Advantages for printing include better match with reality, all tips writing at same time, and when switching probes, maintaining benefits of prior processes.

BRIEF DESCRIPTION OF THE DRAWINGS

FIGS. 9(A)-11(B) illustrate calibration leveling in a scanning probe instrument according to one embodiment.

DETAILED DESCRIPTION

Scanning Probe Instrument and Scanner Assembly

Scanning probe instruments, microscopy, and methods are generally known in the art including for example atomic force microscopy instruments and methods. See for example Bottomley et al., Anal. Chem., 70, 425R-475R, and references cited therein; Nyffenegger et al., Chem. Rev., 1997, 1195-1230 and references cited therein. Patent literature includes for example U.S. Pat. Nos. 5,705,814; 4,954,704; 4,999,494; 5,204,531; 5,705,814; 6,008,489; and 6,032,518. AFM instruments can be obtained from for example Pacific Nanotechnology Inc. (PNI) (Santa Clara, Calif.).

In particular, instruments and related supplies and accessories to practice the various embodiments described herein can be obtained from NanoInk (Chicago, Ill.) including the NSCRIPTOR.™ Fundamental aspects to use of this and other instruments include for example (i) preparing the work environment, (ii) designing a pattern in InkCAD or AutoCAD, (iii) depositing a pattern of molecules, and (iv) inspecting the pattern. System hardware features can include (i) closed loop scanning with high linearity, high speed scan capability and low drift rate, (ii) motorized three point leveling of the X-Y scan plane relative to the sample surface, (iii) high quality optics for high resolution video monitoring of the tip-sample relationship, and (iv) scanning tip control to improve operation with large samples, relative to sample scanning systems.

The scanning probe instrument can be adapted not only for imaging but also for deposition printing and direct write nanolithography by transfer of material from cantilever and tips to surfaces. These adaptations include for example adapted software and hardware, including scanning mechanisms. In addition, environmental chambers can be used to control for example temperature, humidity, air flow, and light.

Figure 3:
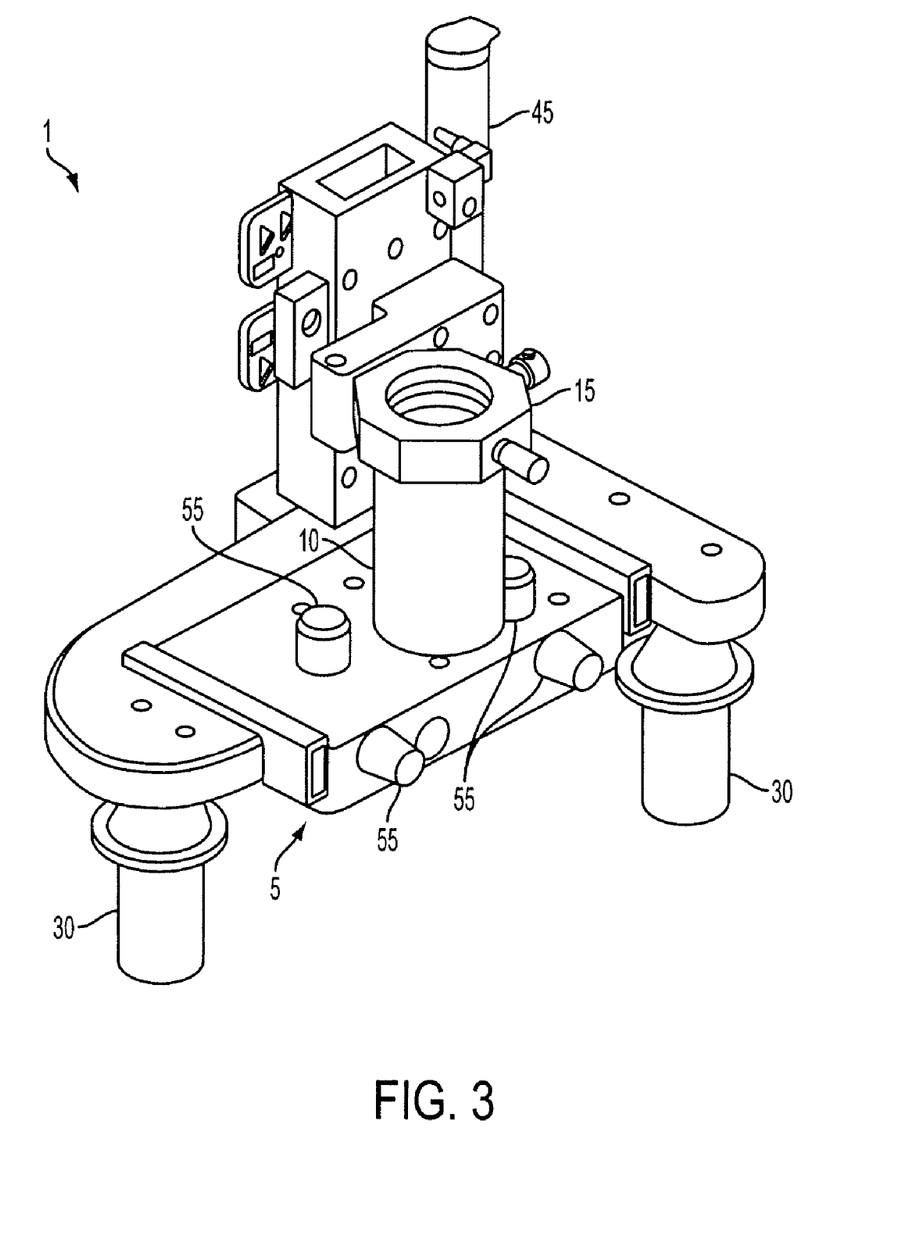
FIG. 3 is a perspective view of a scanning probe instrument according to one embodiment.

FIG. 3 is a perspective view of important elements in a scanning probe instrument 1 according to one embodiment. In FIG. 3, 5 is a scanner body, 55 are laser adjust knobs and photodetector knobs, 30 are z axis motors, 15 is an adjustable lens collar, 45 is a zoom motor, and 10 is a lens. A scanner head is not shown on the bottom side of the optical lens. Magnetic methods and bracket and tie clips can be used to operatively couple the scanner to the probe chips and array of cantilevers.

Figure 4:
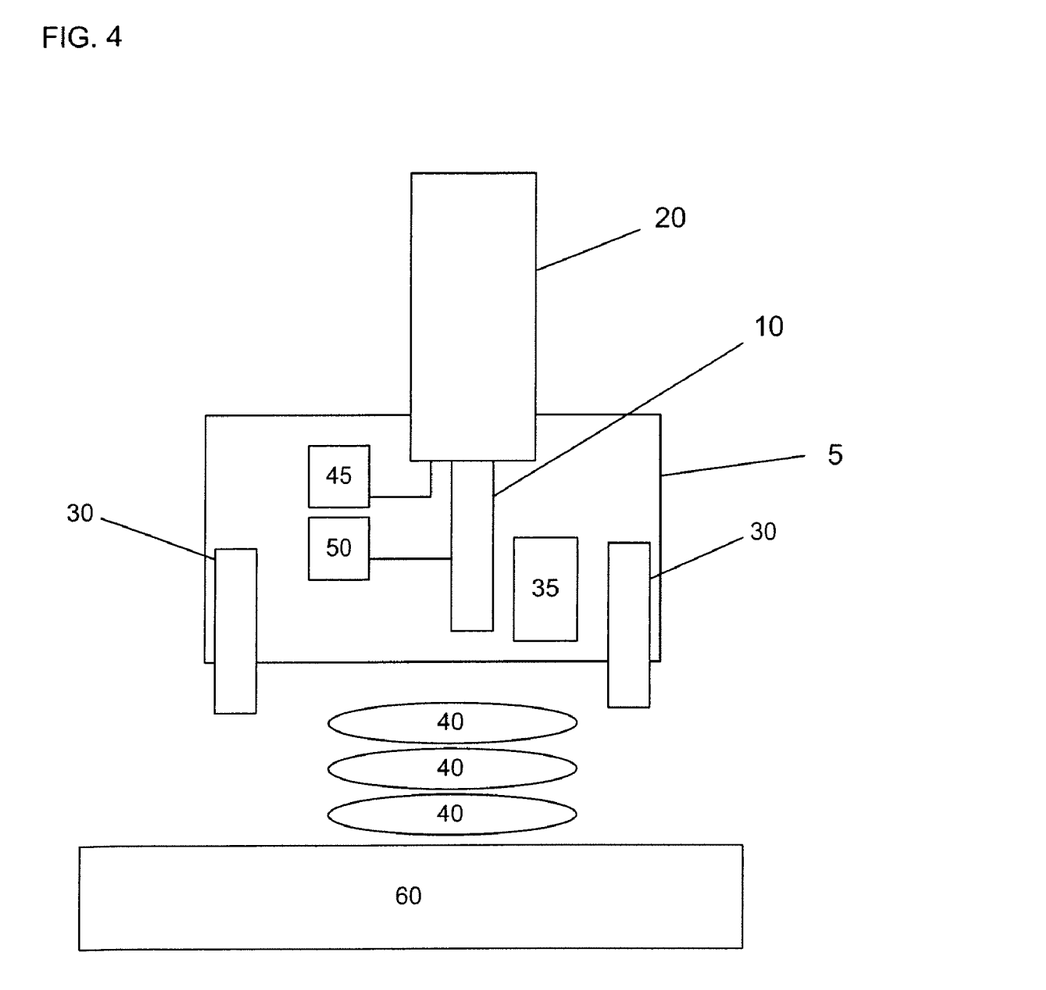
FIG. 4 is a block diagram of a scanning probe instrument according to one embodiment.

In addition, FIG. 4 is a block diagram of a scanning probe instrument 1 as shown in FIG. 3. The scanning probe instrument 1 can have a scanner housing 5 which can serve as a frame and mounting platform for the scanning probe instrument 1 components. The scanning probe instrument 1 components can include but are not limited to an optical lens system including a lens 10, lens collar 15 and a video camera 20, a scanner (not shown), one or more motors 30 for leveling the scanner, one or more motors 35 for translating a sample holder 40 in the X-Y direction with a sample translator 60, a zoom motor 45 for implementing the video camera 20 zoom, a focus motor 50 (not shown) for implementing the video camera 20 focus and one or more knobs 55 for adjusting the scanning probe instrument 1 settings. Piezoelectric scanning can be used.

A lens 10 can be mounted to the scanner housing 5 via an adjustable lens collar 15. The lens 10 may be any type of lens 10 suitable for nanolithography applications. Preferably, the lens 10 can be a long working distance (LWD) lens that allows panning the field of view over 1 mm of viewable travel. The long working distance (LWD) lens can be capable of at least 10× magnification.

A video camera 20 can be mounted above the portion of the scanner housing 5 shown in FIG. 3 and is operably connected to the lens 10. The video camera 20 may be a variety of types of camera suitable for nanolithography imaging. Preferably, the video camera 20 is a (Charged-Couple Device) CCD video camera with motorized zoom and focus capability. According to one embodiment, the video camera 20 is capable of 4× magnification using the zoom capability. Preferably the total video magnification of the video camera 20 is 900×, with a 260×340 micron field of view with a 3 micron resolution. A zoom motor 45 can be actuated to implement the video camera's 20 zoom functionality. Similarly, to adjust the focus of the video camera 20, a focus motor 50 is actuated.

As stated above, the X-Y translation motors 35 can be configured to position the sample holder 40 in the x and y direction. Preferably, the X-Y translation motors are configured for a minimum step size of 3 microns with a maximum slew rate of 2.5 mm/sec. According to one embodiment, the sample holder 40 is grounded and may be comprised of one or more stainless steel disks with a magnetic central post. The sample holder 40 can be capable of holding a substrate 41 of various sizes and dimensions. According to one embodiment, the maximum size for a substrate 41 that can be placed on a sample holder 40 is two (2) inches across and 1.5 inches thick.

Scanner and Array

Figure 5:
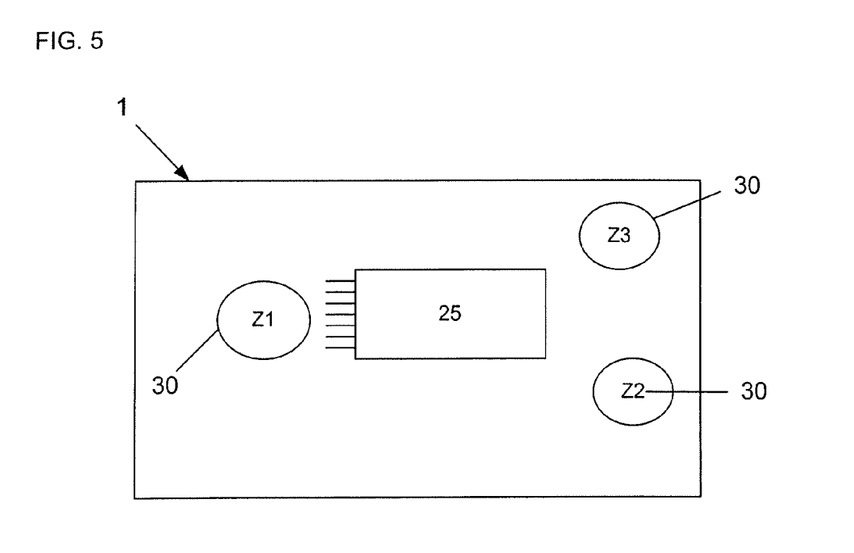
FIG. 5 is a block diagram of a top view of a scanning probe instrument according to one embodiment.

A probe chip 25 is shown in FIG. 5, which can be operatively coupled to a scanner with use of mechanical clips and magnetic methods known in the art. The system can be adapted for use with a single cantilever and tip, a one dimensional array of cantilever and tips, or even a two dimensional array of cantilever and tips. Preferably, the probe chip 25 has a linear array of cantilevers. The plurality of cantilevers can have a symmetry in which the cantilevers all have a substantially similar shape and size including for example substantially same cantilever geometry and length and substantially the same tip length and tip angle. According to another embodiment, the probe chip 25 has a two-dimensional array of cantilevers. Preferably, the array of cantilevers is a passive array. However, arrays can be used wherein the cantilevers are adapted for active pen use or thermal DPN printing. The cantilever tips provide an opening coupled to a microfluidic channel. According to one embodiment, the cantilever tips are nanoscopic tips. Alternatively, the cantilever tips are atomic force microscope tips.

U.S. patent application No. 60/792,950 filed Apr. 19, 2006; Ser. No. 11/690,738 filed Mar. 23, 2007; and 60/894,657 filed Mar. 13, 2007 describe two dimensional arrays of cantilevers and tips and are each hereby incorporated by reference in its entirety.

The cantilevers on probe chip can be loaded into a metal tip clip 24. The metal tip clip 24 can be loaded similar to a cassette into the scanner housing 5 so that the scanner 25 is positioned directly above a loaded sample holder 40. As shown in FIG. 5, one or more motors 30 are employed by the scanning probe instrument 1 to manipulate the scanner and probe chip 25 in the z-direction. The z-direction motors 30 are arranged in a triangular pattern around or surrounding the probe chip 25. The z-direction motors 30 are configured to arrange the probe chip 25 so that each cantilever tip in the probe chip 25 comes into contact with a substrate 41 on a sample holder 40 at a level angle. Preferably, the scanner housing 5 employs three (3) z-directional motors (Z1, Z2, Z3) 30. Each z-direction motor 30 is independently adjustable but is also capable of being adjusted simultaneously. The z-motors can surround the probe chip in a triangular relationship for three point leveling.

Calibration Leveling System

Figure 6:
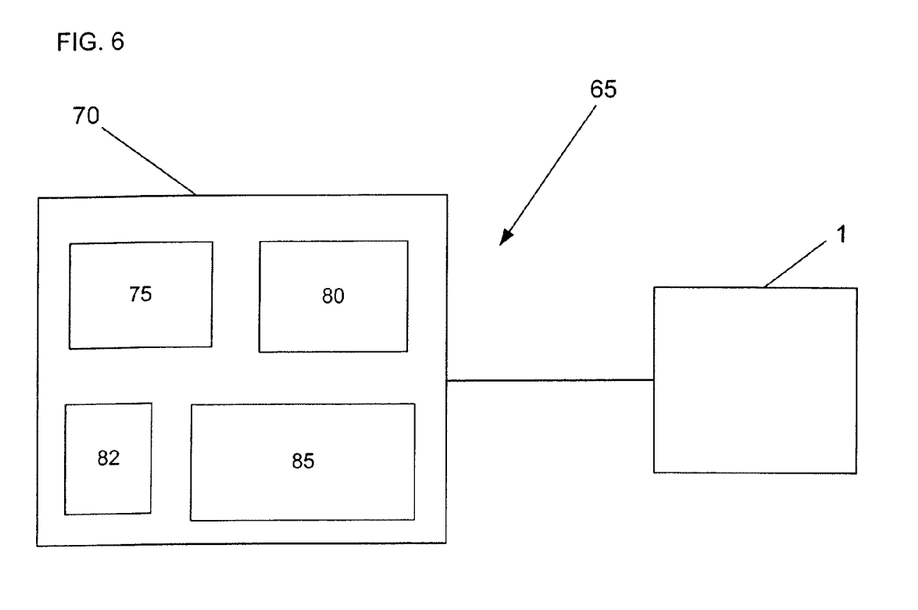
FIG. 6 is a block diagram of a calibration leveling system according to one embodiment.

FIG. 6 is a block diagram of a calibration leveling system 65 according to another embodiment. As shown the calibration leveling system 65 includes a scanning probe instrument 1 operably connected to a controller 70. The controller 70 includes a processor 75, memory 80, an input unit 82 and a display 85. Preferably, the controller is a desktop PC. The memory 80 stores software for operating and calibrating the scanning probe instrument 1.

Figure 7:
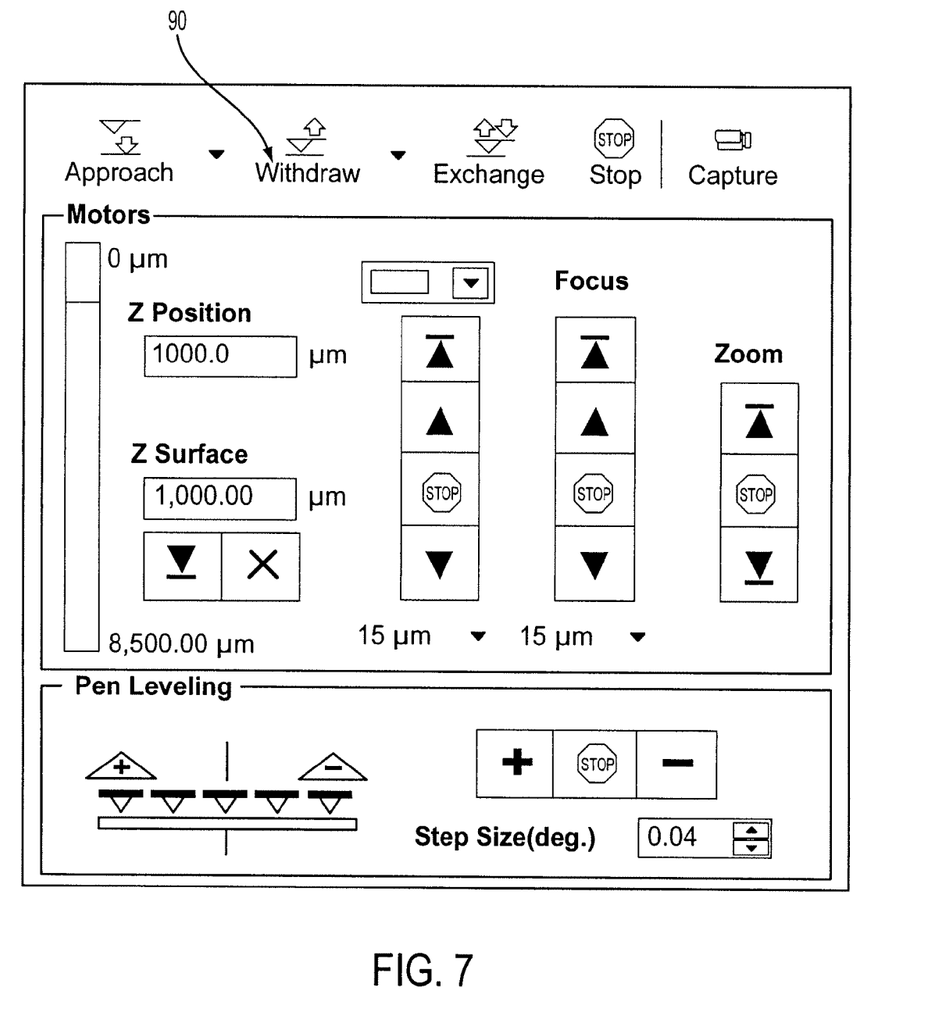
FIG. 7 shows the graphical user interface for a calibration leveling system according to one embodiment.

FIG. 7 shows a user interface 90 for the controller 70 according to one embodiment. A user inputs commands using an input unit 82 via the user interface 90 to perform calibration leveling functions such as actuating one or more motors 30 in the scanning probe instrument 1. The processor 75 is configured to execute the software stored in the memory 80 and the users' commands. In addition, the memory 80 may store settings and other relevant information obtained from the scanning probe instrument 1. Step size variables can be designed into the software and hardware. Step size can be adapted so that step size is reduced as tips approach the surface. Focus and zoom controls can be built into the software and hardware.

InkCAD and other software to control instrument use is available from NanoInk, Inc. (Chicago, Ill.).

Methods of Calibration Leveling

A method for performing calibration leveling using the calibration leveling system 65 will now be described with reference to FIGS. 8-11(B). First a scanner 25 can be loaded into the sensor housing 5 (Step 100). Next, the focus motor 45 can be actuated to raise the lens 10 a predetermined height (Step 105). Preferably, the lens 10 can be raised for example 4,000 μm relative to the scanner of the sensor assembly 1, so that sufficient room exists for scanner assembly to attain its level position without grinding or other problems. As shown in step 110, the z-axis motors 30 can be then simultaneously brought to the top of their range or zeroed out. Next, as a further precaution, each z-axis motor 30 can be individually zeroed out (Step 115). According to one embodiment, three z-axis motors in total are used.

Figure 8:
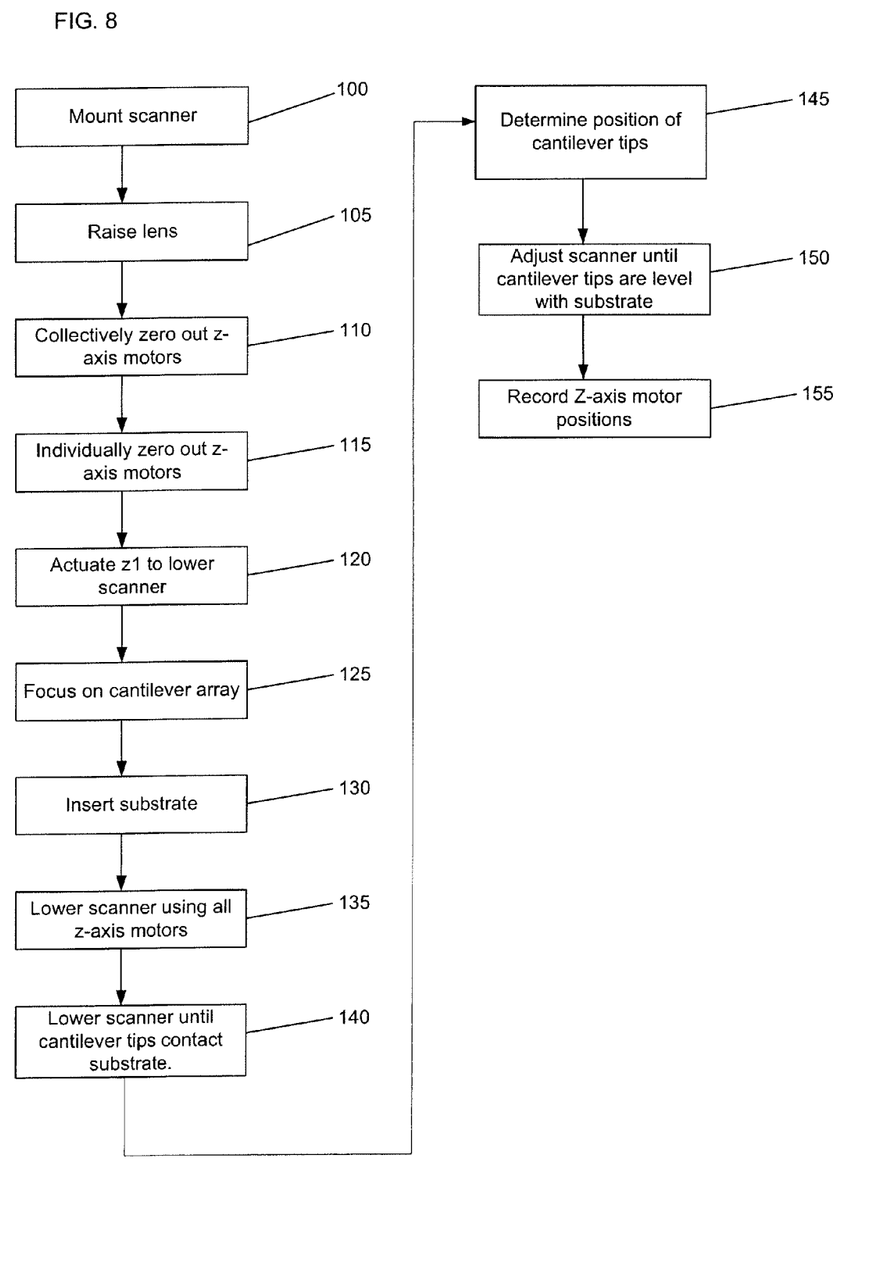
FIG. 8 is a flow chart illustrating a method for performing calibration leveling in a scanning probe instrument according to one embodiment.

After the z-axis motors 30 have been zeroed, a first z-axis motor 30 can be actuated to lower the scanner 25 by a predetermined amount (Step 120). Preferably the scanner 25 can be lowered by 3000 μm. Lowering the scanner 25 by this amount substantially reduces the chances that a tip clip 24 enclosing the scanner 25 will rub against a sample 41. Next, the focus motor 45 is actuated again to move the lens 10 so that it focuses on the cantilever array in scanner 25 (Step 125). As shown in step 130, a blank, flat substrate 41 is then inserted onto the sample holder 40.

Figure 9A:
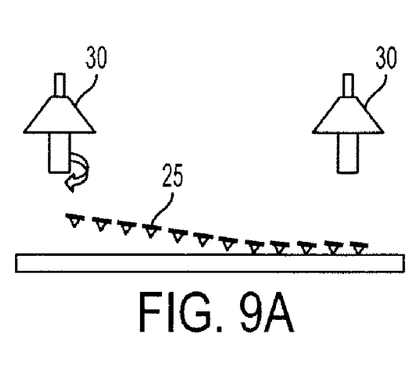
Figure 9B:
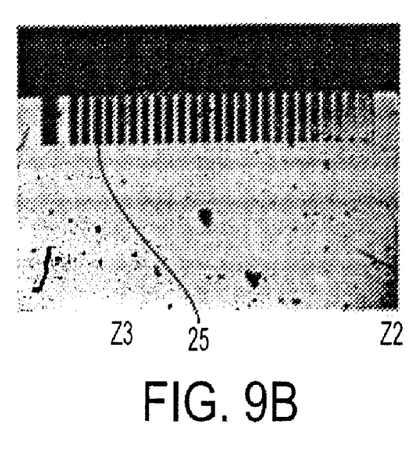
Figure 10A:
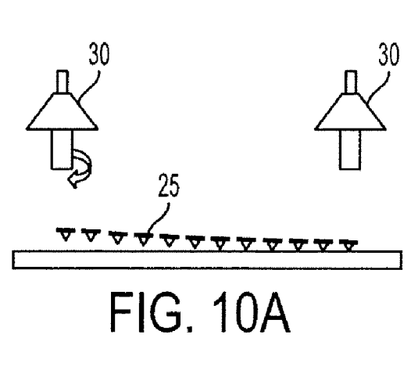
Figure 10B:
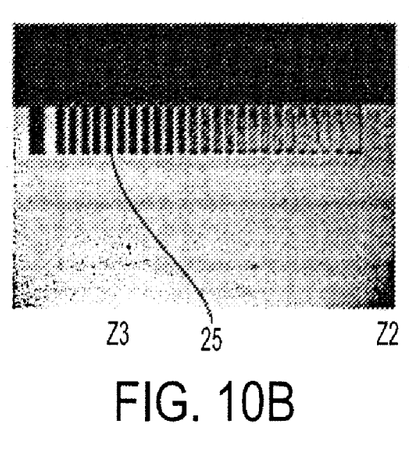

Using each z-axis motor 30, the scanner 25 can be manually lowered to approach the surface of the substrate 41 until the scanner 25 is a predetermined distance from the substrate 41 (Step 135). According to one embodiment, the scanner 25 can be lowered until the cantilever tips are approximately 10-20 μm from the surface of the substrate 41. Next, in increments of five (5) μm or less, one or more z-axis motor 30 can be actuated to lower the scanner 25 until one or more cantilever tips touch the substrate 41 (Step 140). As shown in step 145, using the video camera 20, the system 65 can determine the present orientation and location of the scanner 25 and if any of the cantilever tips are touching the substrate 41. An exemplary depiction of the cantilever tips of a scanner 25 and cantilevers and tips first coming into contact with the substrate 41 is shown in FIG. 9(A). FIG. 9(B) is a photograph of a top-view of the scanner 25 and cantilevers and tips depicted in FIG. 9(A).

Figure 11A:
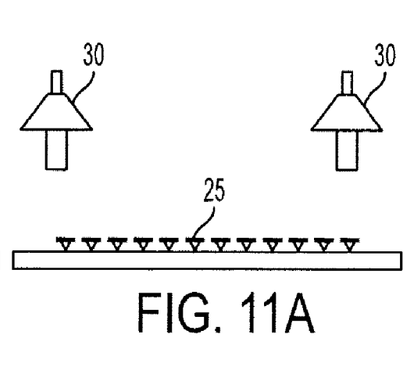
Figure 11B:
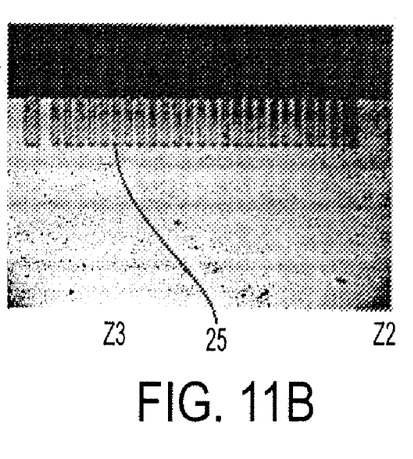

Using a second and/or third z-axis motor, the scanner 25 can be adjusted to position the cantilever tips level relative to the substrate 41 (Step 150). FIGS. 10(A)-11(B) depict how a third z-axis motor 30 is actuated in order to position the cantilever tips of the scanner 25 level relative to the substrate 41. As shown, a third z-axis motor 30 can be actuated to lower the left side of the scanner 25 so that each cantilever tip comes into contact with the substrate 41 at a level position. FIG. 11(B) shows a correctly positioned scanner 25 along with the cantilevers and tips. Finally, the motor positions of each z-axis motor can be recorded for future reference (Step 155) for later patterning or imaging.

The system and method described above has many advantages. For example, the system can arrange a scanner 25 in a level position with respect to a substrate. The positioning of the scanner can be determined optically. Once calibrated, the relative positions of the motors used to actuate the scanner 25 can be recorded for future reference. Thus, the user of the sensor assembly may use subsequent scanners 25 with the confidence that the scanning probe instrument is calibrated correctly. A correctly calibrated scanning probe instrument reduces the occurrence of noise, non-orthogonal and curvy features and probe fishtailing that is generally observed in conventional nanolithography systems.

Printing and Imaging

Nanolithographic printing is described in for example U.S. Pat. Nos. 6,635,311 and 6,827,979 to Mirkin et al.

Another printing system is described in WO 2005/115630 to Henderson et al., as well as in U.S. Pat. No. 7,008,769 to Henderson et al.

All references described herein are hereby incorporated by reference in their entirety.

What is claimed is:

1. A method comprising:
   providing a scanning probe instrument comprising a scanner operatively coupled to a one-dimensional array of cantilevers comprising cantilever tips;
   providing a substantially flat substrate surface;
      wherein the position of the array of cantilever tips with respect to the substrate is controlled by three z-axis motors Z1, Z2, and Z3 in a triangular, surrounding relationship with respect to the array;
      wherein the Z1, Z2, and Z3 motors are adapted to raise and lower the cantilever tips with respect to the surface;
      wherein the Z1 motor is also adapted to tilt the cantilever tips with respect to the substrate surface, and the Z2 and Z3 motors are adapted to level the cantilever tips with respect to the substrate surface;
   lowering the array until at least some of the cantilever tips touch the substrate surface;
   determining whether the array of cantilevers are substantially level by observing a reflected light from the array of cantilevers;
   adjusting the Z2 motor, the Z3 motor, or both Z2 and Z3 motors, until all the cantilever tips are substantially level with respect to the substrate surface;
   recording the relative positions of the z-axis motors for future calibration reference; and
   printing by depositing material from the cantilever tips to the substrate surface.

2. The method according to claim 1, wherein the array of cantilevers is a passive array.

3. The method according to claim 1, wherein the array of cantilevers is an active array.

4. The method according to claim 1, wherein the cantilever tips are nanoscopic tips.

5. The method according to claim 1, wherein the cantilever tips are atomic force microscope tips.

6. The method according to claim 1, wherein the cantilever tips provide an opening coupled to a microfluidic channel.

7. The method according to claim 1, wherein an optical lens system is used to determine whether the cantilever tips are level.

8. The method according to claim 1, wherein an optical lens system is used to determine whether the cantilever tips are level by observation of reflected light from the cantilevers.

9. The method according to claim 1, wherein lowering is carried out at increments of less than 5 microns until the cantilever tips touch the surface of the substrate.

10. A method comprising:
    providing a scanning probe instrument having one or more z-axis motors mounted to the scanning probe instrument, for controlling a scanner operatively coupled to a one-dimensional array of cantilevers comprising cantilever tips;
    positioning the scanner until one or more cantilever tips touch a substrate;
    determining the position of the cantilever tips on the surface of the substrate by observing a reflected light from the one-dimensional array of cantilevers;
    adjusting one or more z-axis motors to position the array of cantilevers so that each cantilever tip is in level contact with the substrate;
    recording the relative positions of the z-axis motors; and
    printing by depositing material from the cantilever tips to the substrate surface.

11. A method comprising:
    providing a scanning probe instrument having one or more z-axis motors mounted to the scanning probe instrument, for controlling a scanner operatively coupled to a one-dimensional array of cantilevers comprising cantilever tips;
    lowering the scanner toward the surface of a sample holder a predetermined amount using a first z-axis motor;
    focusing on the array using an optical lens system;
    positioning the scanner until one or more cantilever tips touch a substrate;
    determining the position of the cantilever tips on the surface of the substrate based on a reflected light from the one-dimensional array of cantilevers;
    adjusting one or more z-axis motors to position the array of cantilevers so that each cantilever tip is in substantial level contact with the substrate;
    recording the relative positions of the z-axis motors; and
    printing by depositing material from the cantilever tips to the substrate surface.

12. The method as claimed in claim 11, wherein the scanning probe instrument further comprises:
    a video camera mounted to the scanning probe instrument;
    a lens mounted on an adjustable collar attached to the scanning probe instrument;
    a sample holder for holding a substrate;
    one or more motors, mounted to the scanning probe instrument, for adjusting the sample holder in the x and y direction;
    a motor for controlling a zoom function of the video camera; and
    a motor for controlling a focus function of the video camera.

13. The method as claimed in claim 11, wherein the lowering step further comprises:
    mounting a probe chip into the scanning probe instrument;
    raising the lens to a predetermined height; and
    zeroing out one or more z-axis motors.

14. The method as claimed in claim 11, wherein the focusing step is performed by lowering the lens toward the surface of the sample holder.

15. The method as claimed in claim 11, wherein the positioning step further comprises:
    inserting a substrate onto the sample holder;
    lowering the array toward the substrate until the scanner is a predetermined distance from the substrate; and
    lowering the array in predetermined increments until one or more cantilever tips touch the substrate.

16. The method for performing calibration leveling as claimed in claim 11, wherein the video camera is used to determine the orientation of the cantilever tips on the surface of the substrate.

17. A method comprising:
providing a scanning probe instrument comprising a scanner operatively coupled to a one-dimensional or two diniensional array of cantilevers comprising cantilever tips;
providing a substantially flat substrate surface;
 wherein the position of the array of cantilever tips with respect to the substrate is controlled by three z-axis motors Z1, Z2, and Z3 in a triangular, surrounding relationship with respect to the array;
 wherein the Z1, Z2, and Z3 motors are adapted raise and lower the cantilever tips with respect to the surface;
 wherein the Z1 motor is also adapted to tilt the cantilever tips with respect to the substrate surface, and the Z2 and Z3 motors are adapted to level the cantilever tips with respect to the substrate surface;
lowering the array until at least some of the cantilever tips touch the surface;
adjusting the Z2 motor, the Z3 motor, or both Z2 and Z3 motors, until all the cantilever tips are substantially level with respect to the substrate surface, wherein an optical lens system is used to determine whether the array of cantilever tips are level by observation of reflected light from the array of cantilevers;
recording the relative positions of the z-axis motors for future calibration reference; and
printing by depositing material from the cantilever tips to the substrate surface.

18. The method of claim 17, wherein the scanner is magnetically coupled.

19. The method of claim 17, wherein the scanner is coupled to a two dimensional array of cantilevers.

* * * * *